US012045010B2

(12) United States Patent
Dierking et al.

(10) Patent No.: US 12,045,010 B2
(45) Date of Patent: Jul. 23, 2024

(54) SYSTEM, METHOD, AND APPARATUS FOR DIGITAL HOLOGRAPHIC VIBRATION IMAGING WITH INTEGRATED SYSTEM PHASE CORRECTION

(71) Applicant: Exciting Technology LLC, Dayton, OH (US)

(72) Inventors: Matthew P. Dierking, Springfield, OH (US); Anna Hecht, Dayton, OH (US)

(73) Assignee: Exciting Technology LLC, Dayton, OH (US)

( * ) Notice: Subject to any disclaimer, the term of this patent is extended or adjusted under 35 U.S.C. 154(b) by 0 days.

(21) Appl. No.: 18/396,691

(22) Filed: Dec. 26, 2023

(65) Prior Publication Data

US 2024/0134314 A1 Apr. 25, 2024

Related U.S. Application Data

(63) Continuation of application No. PCT/US2023/010855, filed on Jan. 16, 2023.
(Continued)

(51) Int. Cl.
*G03H 1/08* (2006.01)
*G01B 9/02001* (2022.01)
(Continued)

(52) U.S. Cl.
CPC ....... *G03H 1/0866* (2013.01); *G01B 9/02007* (2013.01); *G01B 9/021* (2013.01);
(Continued)

(58) Field of Classification Search
CPC .. G03H 1/0443; G03H 1/0486; G03H 1/0866; G03H 2001/0033; G01B 9/02007; G01B 9/021
See application file for complete search history.

(56) References Cited

U.S. PATENT DOCUMENTS 6,385,215 B1 5/2002 Sumiyoshi
9,581,967 B1 * 2/2017 Krause ................ G03H 1/0443
(Continued)

FOREIGN PATENT DOCUMENTS

WO 2023183078 A2 9/2023
WO 2023183078 A3 11/2023

OTHER PUBLICATIONS

PCT/US2023/010855 , "International Application Serial No. PCT/US2023/010855, International Search Report and Written Opinion mailed Oct. 19, 2023", Exciting Technology LLC, 9 pages.

*Primary Examiner* — Michael A Lyons
(74) *Attorney, Agent, or Firm* — GTC Law Group PC & Affiliates

(57) ABSTRACT

An example system includes a master oscillator that provides a master oscillator beam, a first fiber beam splitter that splits the master oscillator beam into a first branch and a second branch, a second fiber beam splitter that splits the first branch into an imaging branch and an amplified characteristic branch, and a compensation branch mixer that mixes the second branch and the amplified characteristic branch into a compensation branch. The example system includes transmission optics that direct the imaging branch to a target location, an imaging mixer that mixes the compensation branch and a reflected image from the target location into an imaging signal, and an acquisition device that receives the imaging signal as a final image. An example system optionally includes a mode matching lens that applies a selected wavefront characteristic to the compensation branch.

32 Claims, 11 Drawing Sheets

Related U.S. Application Data

(60) Provisional application No. 63/321,067, filed on Mar. 17, 2022.

(51) Int. Cl.
  *G01B 9/021* (2006.01)
  *G01H 9/00* (2006.01)
  *G03H 1/00* (2006.01)
  *G03H 1/04* (2006.01)

(52) U.S. Cl.
  CPC .............. *G01H 9/00* (2013.01); *G03H 1/0005* (2013.01); *G03H 1/0443* (2013.01); *G03H 1/0486* (2013.01); *G03H 2001/0033* (2013.01); *G03H 2001/0077* (2013.01)

(56) References Cited

U.S. PATENT DOCUMENTS

| | | |
|---|---|---|
| 2002/0075562 A1 | 6/2002 | Youn et al. |
| 2004/0075891 A1 | 4/2004 | Hwang et al. |
| 2011/0085230 A1 | 4/2011 | Rapp et al. |
| 2019/0250392 A1 | 8/2019 | Cuche et al. |
| 2020/0141715 A1* | 5/2020 | Furman ................ G03H 1/0465 |

* cited by examiner

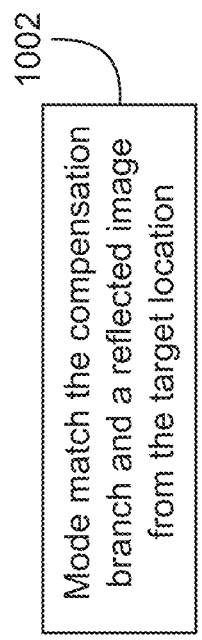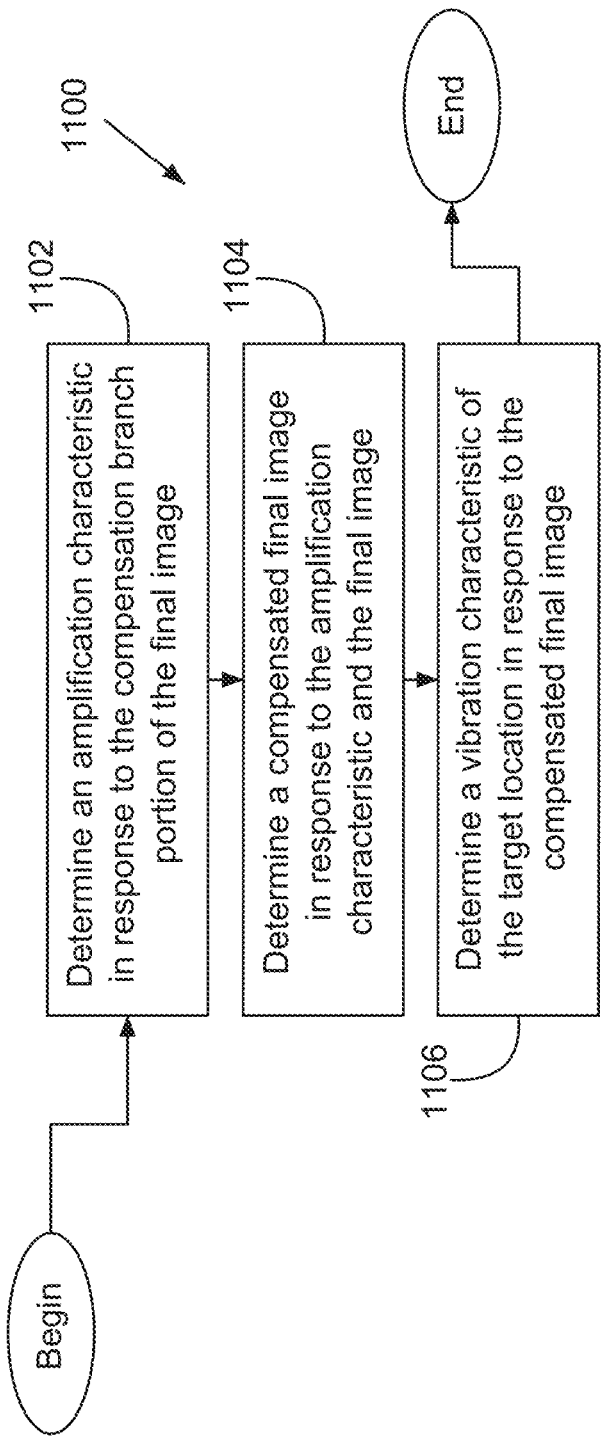

SYSTEM, METHOD, AND APPARATUS FOR DIGITAL HOLOGRAPHIC VIBRATION IMAGING WITH INTEGRATED SYSTEM PHASE CORRECTION

CROSS-REFERENCE TO RELATED APPLICATIONS

This application claims the benefit of, and is a continuation of, International Application Number PCT/US2023/010855, filed Jan. 16, 2023, entitled "SYSTEM, METHOD, AND APPARATUS FOR DIGITAL HOLOGRAPHIC VIBRATION IMAGING WITH INTEGRATED SYSTEM PHASE CORRECTION", and published on Sep. 28, 2023 as WO 2023/183078 (EXCT-0012-WO).

International Application Number PCT/US2023/010855 claims the benefit of U.S. Provisional Patent Application No. 63/321,067, filed Mar. 17, 2022, and entitled "SYSTEM, METHOD, AND APPARATUS FOR DIGITAL HOLOGRAPHIC VIBRATION IMAGING WITH INTEGRATED SYSTEM PHASE CORRECTION" (EXCT-0012-P01).

All of the foregoing applications are hereby incorporated by reference as if fully set forth herein in their entirety.

GOVERNMENT LICENSE RIGHTS

This invention was made with government support under government contract #FA8649-20-C-0319 awarded by the United States Air Force. The government has certain rights in this invention.

BACKGROUND

Previously known imaging vibrometry systems suffer from a number of drawbacks. Systematic phase drift, or phase perturbation, is present in such systems, for example due to amplification or other adjustments utilized to enhance the range or other aspects of the system. Systematic phase drift present in imaging systems reduces the effective range, effective resolution, system power, and imaging target size available for the system, thereby limiting the applications and performance outcomes for such systems. Some previously known systems do not compensate for systematic phase drift, accepting the consequent range and/or detection capability limits. Some previously known systems utilize a segregated monitoring channel to provide for systematic phase drift compensation. Such systems introduce significant cost and complexity in hardware configurations, and require additional processing and synchronization that reduce the final capability of the system, for example due to tolerance stack-ups in synchronizing data streams, and a requirement to capture additional data streams to support compensation.

SUMMARY

Embodiments herein provide for integrated compensation for phase perturbations in an imaging vibrometer system. Embodiments herein provide for a reduced hardware cost and complexity for systems, while maintaining the same or improved performance, including performance aspects such as range to target, image resolution, target imaged size, and system power throughput capability.

Example aspects of embodiments herein include mixing a compensation signal to be viewed in a final image including target imaging information, capability to utilize multiple measurements to enhance compensation for long range applications, and poly pulse processing applied to each pixel in a volume of holographic data. In certain further aspects, embodiments herein utilize mode matching for a compensation signal to enhance mixing, reduce processing burdens, and improve final effective detection precision. In certain further aspects, embodiments herein selectively utilize pupil plane imaging, or image plane imaging combined with a computationally determined complex image from the image plane image.

BRIEF DESCRIPTION OF THE DRAWINGS

FIG. 10 is a schematic flow diagram of a procedure for mode matching a compensation branch for holographic vibration imaging.

FIG. 11 is a schematic flow diagram of a procedure for compensating a final image and determining a vibration characteristic of a target location.

DETAILED DESCRIPTION

Figure 1:
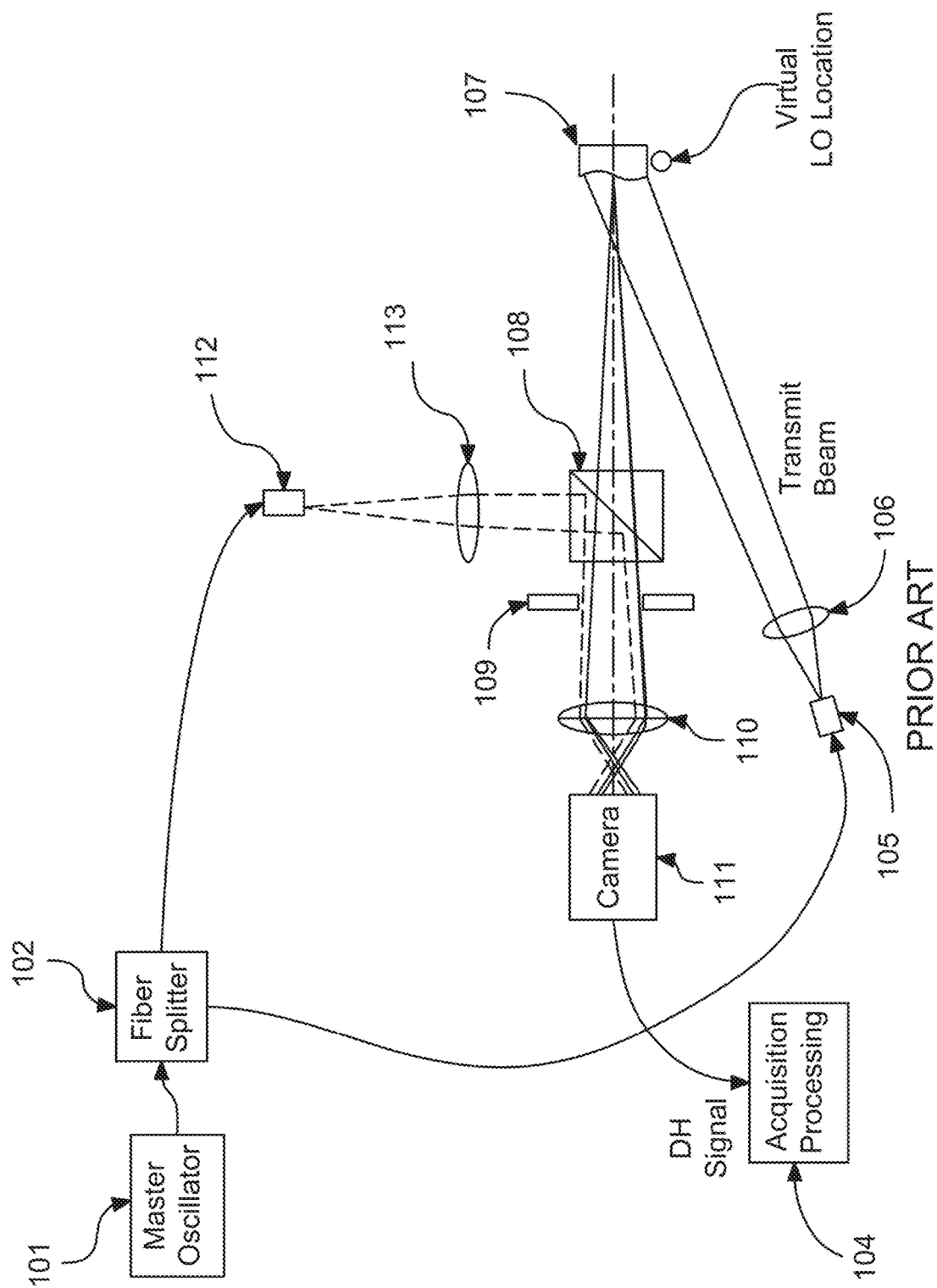
FIG. 1 depicts a previously known system for an imaging vibrometer.

Referencing FIG. 1, an example previously known system for performing vibration imaging is depicted. The example system includes a master oscillator 101, and a fiber splitter 102 that divides the master oscillator beam into an imaging beam (emitted from fiber terminator 105) and a local oscillator beam (emitted from fiber terminator 112). The imaging beam is transmitted to the target 107 through imaging optics 106, and a reflected image is combined at mixer 108 with the local oscillator. A comparison of phase differences between the reflected image from the target with the local oscillator allows for the determination of movement (and vibration) of the target. The example system further includes local oscillator optics 113, an aperture 109 for collecting the imaging light from the target, final optics 110 to focus the imaging light onto a camera 111, and an acquisition/processing component 104 that determines the vibration of the target in response to the reflected light. In the example of FIG. 1, the virtual local oscillator location is depicted, showing where the local oscillator is placed on the image returned from the target. The example of FIG. 1 has limited range capability.

Figure 2:
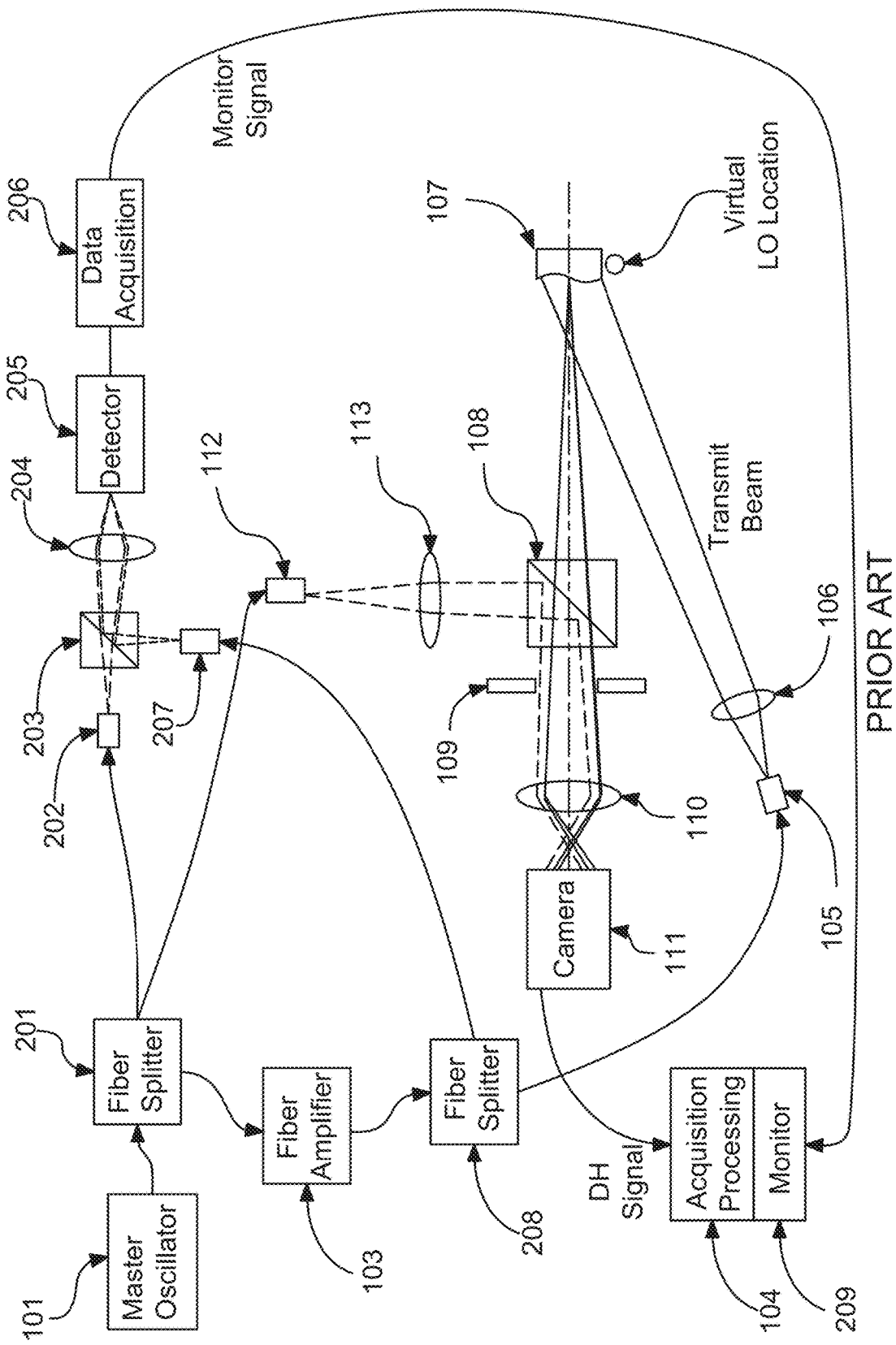
FIG. 2 depicts a previously known system for an imaging vibrometer.

Referencing FIG. 2, an example previously known system for performing vibration imaging is depicted. The example system utilizes a fiber amplifier 103 to boost the imaging beam, extending the range of the system. However, the fiber amplifier 103 introduces distortion, temporal phase perturbations, or other artefacts into the signal, which limit the capability of the system. The example of FIG. 2 includes a fiber splitter 201 that provides a monitor branch (e.g., emitted at fiber terminator 202), and a local oscillator branch (e.g., emitted at fiber terminator 112). The monitor branch is combined at mixer 203 with a post-amplification branch (e.g., emitted from fiber splitter 208 at fiber terminator 207), which is focused by a lens 204 to a detector 205, acquired by a data acquisition component 206, and passed to controller 104 as a monitor signal 209. In the example of FIG. 2, the monitor signal 209 must be synchronized with the main image (from camera 111) to compensate the main image for distortion or other non-idealities injected by the fiber amplifier 103. The synchronization process requires significant processing utilization, and adds a layer of tolerance stack-up or error in the matching of the monitor signal 209 to the main image, thereby reducing the available detection precision (e.g., vibration amplitude and/or frequency resolution), effective range to the target 107 at which acceptable performance can be achieved, and/or power throughput capability of the system (e.g., due to higher distortion injected by a higher power amplifier).

Figure 3:
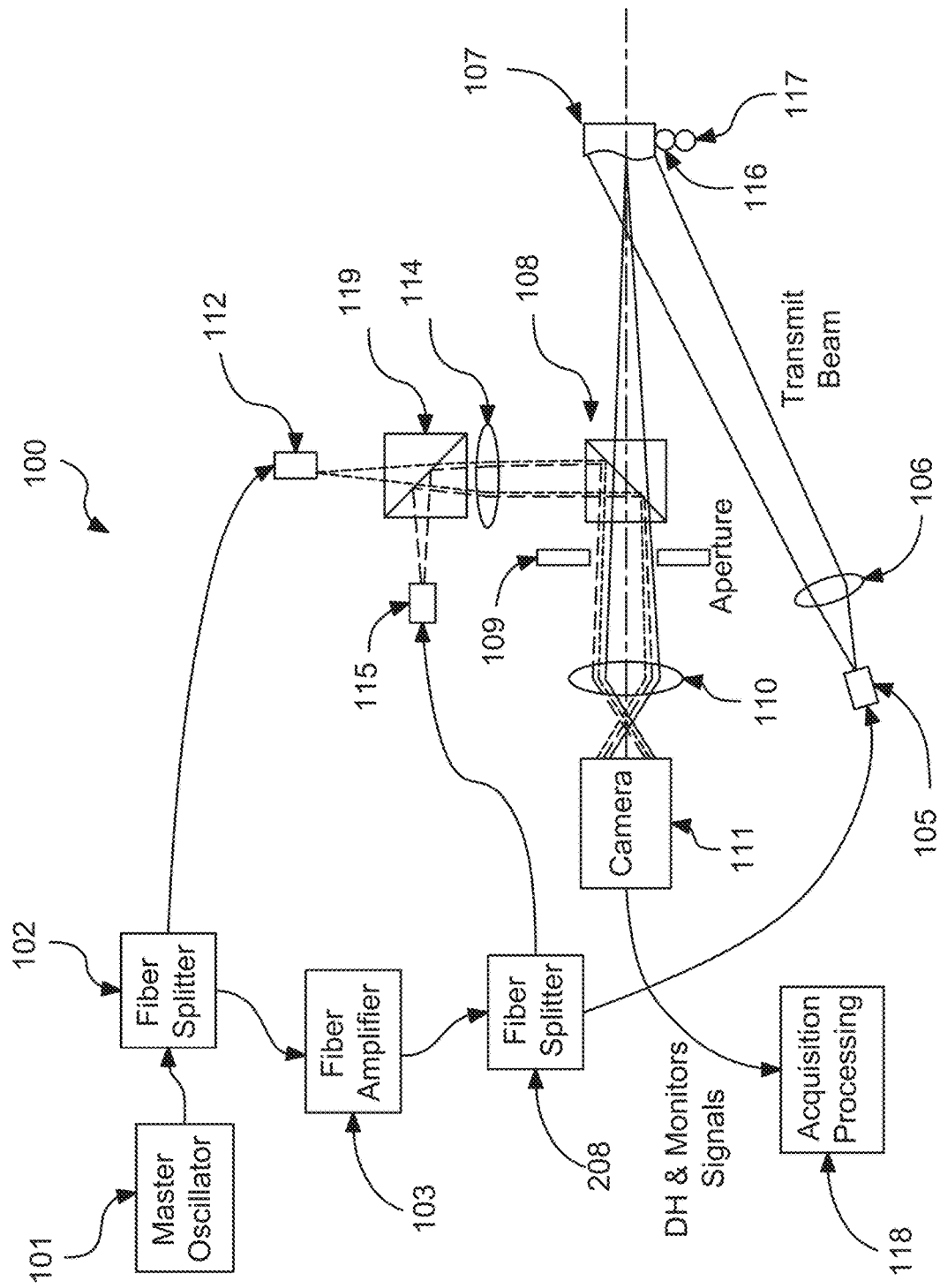
FIG. 3 is a schematic depiction of an example imaging vibrometer of the present disclosure.

Referencing FIG. 3, an example digital holography vibration imaging system 100 is schematically depicted. The example system 100 provides for improved final detection precision, in both the time and spatial domains, allows for reduced processing resources relative to previously known systems, for example by utilizing an integrated monitor signal that is presented on a holographic frame of the final image, and further allows for a reduction in hardware component cost, assembly cost, and integration cost. The example system 100 includes a master oscillator 101 that provides a master oscillator beam, and a first fiber beam splitter 102 that splits the master oscillator beam into a first branch (progressing to fiber amplifier 103 in the example of FIG. 3) and a second branch (progressing to fiber terminator 112 in the example of FIG. 3). In the example system 100, the second branch is utilized as a local oscillator and positioned on the final image, for example at virtual position 116. The example system 100 includes a fiber amplifier 103 that is utilized to boost the first branch, and a second fiber beam splitter 208 that splits the first branch into an imaging branch (e.g., passed to fiber terminator 105, and directed to the target location 107) and an amplified characteristic branch (e.g., passed to fiber terminator 115, which includes any distortion, temporal phase perturbation, and/or non-ideality injected by the fiber amplifier 103).

In the example of FIG. 3, a compensation branch mixer 119 combines the second branch with the amplified characteristic branch, and emits a compensation branch (e.g., to lens 114 and imaging mixer 108), which is a mixed beam having the local oscillator signal and the amplified characteristic signal embedded therein. The compensation branch is utilized to provide a monitor signal that allows for correction of amplification noise, allowing for improved imaging and subsequent determinations (e.g., final target position, range, velocity, vibration characteristics, etc.) relative to previously known systems. In the example of FIG. 3, the local oscillator is positioned at a first virtual position 116 on the final image, and the amplified characteristic signal is positioned at a second virtual position 117 on the final image. The positions 116, 117 may be the same or distinct positions. In certain embodiments, where the positions 116, 117 are the same position, additional processing is performed at the controller 118 to separate the signals to determine the local oscillator portion and the amplified characteristic portion, with the benefit that the supporting local oscillator and amplified characteristic signals take up less space in the final image. In certain embodiments, where the positions 116, 117 are distinct positions, the raw local oscillator and amplified characteristic signals are available on the final image without additional processing, reducing the processing burdens on the controller 118 and improving the final available performance of the vibrometer (e.g., due to information losses incurred in the additional processing). In certain embodiments, one or both of the positions 116, 117 are placed in an unused portion of the final image, for example a portion of the final image dedicated to compensation. In certain embodiments, one or both of the positions 116, 117 are placed on a data portion of the final image, or a position of the final image that is of interest. Where one or both of the positions 116, 117 are placed on the data portion of the final image, additional processing can be performed to determine the relevant signal values (e.g., the local oscillator signal and/or the amplified characteristic signal). In a further example, where one or both of the positions 116, 117 are placed on the data portion of the final image, the final image data at that location can be treated as a blind spot, for example where data representing the reflected light from the imaging branch (e.g., emitted by final optics 106) is not utilized, and/or the final image data at that location can be separated from the local oscillator signal and/or the amplified characteristic signal. In certain embodiments, where one or both of the positions 116, 117 are placed on the data portion of the final image, the positions 116, 117 may be controlled or modulated—for example to move the blind spot to a selected location and/or to clear a particular portion of the target location 107 for imaging without being combined with the local oscillator signal and/or the amplified characteristic signal. In certain embodiments, where one or both of the positions 116, 117 are placed on the data portion of the final image, the positions 116, 117 are fixed, for example where relative movement between the system 100 and the target 107 are expected to modulate the imaged area affected by the positions 116, 117, and/or where additional processing and/or reduced data of the final image at those positions 116, 117 is otherwise acceptable.

The example system 100 includes a mode matching lens 114 positioned between the compensation branch mixer 119 and an imaging mixer 108. The example mode matching lens 114 is optional and non-limiting. In certain embodiments, it is desirable to match a wavefront curvature of the compensation branch to the reflected wavefront curvature of reflected light from the target location 107, which enhances mixing efficiency of the wavefronts and simplifies processing of the final image. In certain embodiments, the divergence characteristics of the second branch and the amplified characteristic branch are matched and/or provided to be acceptably close (e.g., which may depend upon the characteristics of transmitting fibers, the light of each beam, and/or distance between each respective fiber terminator 115, 112 and the compensation branch mixer 119), where a single lens 114 element provides sufficient mode matching for the entire compensation beam traversing therethrough. The optical power of the mode matching lens 114 can be selected based upon the wavefront characteristic(s) of the second branch and the amplified characteristic branch, and optical distances between the compensation branch mixer 119, the lens 114, and/or the imaging mixer 108, as well as the wavefront characteristic of the reflected light from the target location 107 (e.g., based on the distance to the target location 107 and/or optical properties of the intervening medium, such as air). In certain embodiments, the mode matching lens 114 may have a changeable position, for example to match the wavefront characteristic as the range to the target location changes. In certain embodiments, the mode matching lens 114 may have an adjustable optical power, for example using an electronically controlled varifocal lens (VFL), and/or using one or more of a selectable number of lenses that can be positioned in the optical path of the compensation branch. In certain embodiments, the mode matching lens 114 may include one or more lenses that apply distinct wavefront adjustment to each of the second branch and the amplified characteristic branch, for example by using a polarization difference between the branches to apply distinct optical adjustments to each branch. In certain embodiments, the positions of the fiber terminators 112, 115 and/or of the compensation branch mixer 119 may be adjustable to tune the wavefront characteristics of the compensation branch to selectively match and/or be similar to a wavefront characteristic of the reflected light imaged from the target location 107. Accordingly, an example mode matching lens 114 applies a selected wavefront characteristic to the compensation branch.

The example system 100 includes the transmission optics 106 (schematically depicted as a lens) that directs the imaging branch (e.g., from fiber terminator 105) to the target location. The example system 100 includes the imaging mixer 108 that mixes the compensation branch (e.g., from the mode matching lens 114 and/or from the compensation branch mixer 119) and a reflected image from the target location into an imaging signal (passed to the aperture 109 in the example of FIG. 3).

The example system 100 includes an acquisition device that receives the imaging signal as a final image. In the example of FIG. 3, the final image includes an integrated local oscillator (e.g., at virtual position 116) and an amplified characteristic signal (e.g., at virtual position 117) integrated therein, without a separate monitoring branch, synchronization operations, or the like. In the example of FIG. 3, the fields from the target, the local oscillator, and the amplified characteristic signal, are captured at each detection event in a digital holographic measurement, or frame, of the detection. In certain embodiments, the acquisition device is configured to capture the final image as a pupil plane image, which images the pupil (e.g., determined at the imaging mixer 108, at the aperture 109, and/or at a position upstream of a final imaging lens 110). In certain embodiments, the acquisition device is configured to capture the final image as a focal plane image, or focusing the target location 107 on the final image capture device (e.g., the camera 111), for example in a holographic frame of the final image. In certain embodiments, utilizing a pupil plane image reduces processing to determine both the phase information and amplitude information in the final image, and/or improves the precision and/or accuracy of the phase and amplitude information in the final image.

In certain embodiments, the acquisition device includes one or more of the aperture 109, the final imaging lens 110, a camera 111, and/or a controller 118 that captures imaging data from the camera 111. In certain embodiments, one or more of these may be omitted from the system 100, and/or from the acquisition device. In certain embodiments, the camera 111 may be a photonic array, pixel array, or other capture device. In certain embodiments, the camera 111 may be configured to capture imaging data at a selected speed sufficient to support the application, for example based on movement of the target, vibration characteristics of the target, frequency values of light utilized in the system, distance to the target, and the like. In certain embodiments, the camera 111 (or other photonic capture device) includes an image capture speed of greater than 1 kHz, greater than 10 kHz, and/or greater than 20 kHz.

The example system 100 includes a controller 118 having a number of circuits associated therewith, configured to perform one or more operations, procedures, or the like, of embodiments herein. The example of FIG. 3 depicts the controller 118 being on a same device that performs data acquisition and processing. However, the controller 118 may be a separate device, and/or a distributed device, with portions of the controller 118 included with a data acquisition device, and portions of the controller 118 separate from the data acquisition device. In certain embodiments, one or more aspects, circuits, or portions thereof, of the controller 118 may be positioned in physical proximity to the imaging portion of the system 100 (e.g., the portion depicted in FIG. 3), and other aspects, circuits, or portions thereof positioned remotely from the imaging portion of the system 100 (e.g., on a server, cloud computing device, operator laptop, etc.) and at least periodically or intermittently in communication with the imaging portion of the system 100.

The description herein utilizes circuits to describe aspects of the controller 118. A circuit as used herein should be understood broadly, and includes configurations of hardware, sensors, actuators, logic circuits, computer readable instructions, or the like, that are configured to perform operations of the associated circuit. A circuit may be a single device, for example a device positioned within a housing defining the controller 118, and/or a distributed device—for example with a portion of the circuit positioned on the controller 118 and another portion of the circuit in communication with and/or responsive to instructions from the controller 118. In certain embodiments, the controller 118 may be a distributed device, with all or portions of various circuits positioned, at least in part, on portions of the distributed controller 118.

Figure 6:
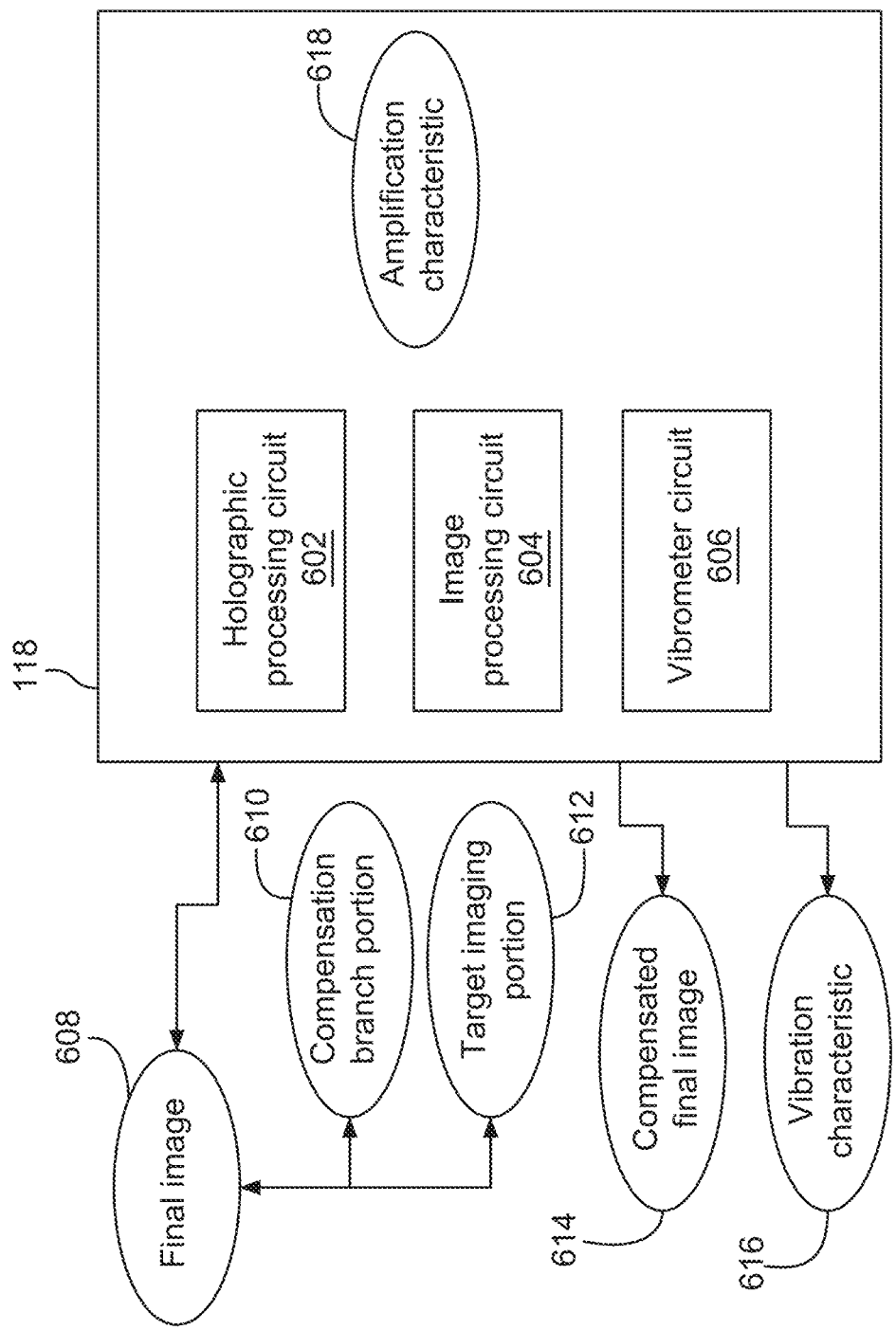
FIG. 6 is a schematic depiction of a controller for providing a vibrometer quality final image of a target location.

Referencing FIG. 6, an example controller 118 includes a holographic processing circuit 602 that determines an amplification characteristic 618 in response to the compensation branch portion 610 of the final image 608. For example, the holographic processing circuit 602 determines variation introduced into the imaging signal by the fiber amplifier, and provides that variation as the amplification characteristic 618. The example controller 118 further includes an image processing circuit 604 that determines a compensated final image 614 in response to the amplification characteristic 618 and the final image 608. It will be understood that, in certain embodiments, determination of a vibration characteristic 616 (e.g., vibration frequency, amplitude, and/or phase) is a goal for certain systems, where determination of the compensated final image 614 is not necessary, and/or is determined as an intermediate value on the way to determining the vibration characteristic 616. The example final image 608 of FIG. 6 includes the compensation branch portion 610 (e.g., as injected into the final image at position 117), a target imaging portion 612 (e.g., the portion of the final image that includes the target area 107), and/or further includes a local oscillator portion (not shown, e.g., as injected into the final image at position 116).

An example controller 118 further includes a vibrometer circuit 606 that determines the vibration characteristic 616 of the target location 107 in response to the compensated final image 614. In certain embodiments, for example where the compensated final image 614 is utilized only as an intermediary value, the vibrometer circuit 606 does not utilize the compensated final image 614 directly, but instead compensates the determination of the vibration characteristic 616 in response to the compensated final image 614 by correcting the signal target vibration information based on the final image as captured and the amplification characteristic 618, without explicitly determining or storing the compensated final image 614. It will be understood that the vibrometer circuit 606 further determines the vibration characteristic 616 in response to the local oscillator (e.g., as injected into the final image at position 116) according to previously known vibrometry operations.

Figure 7:
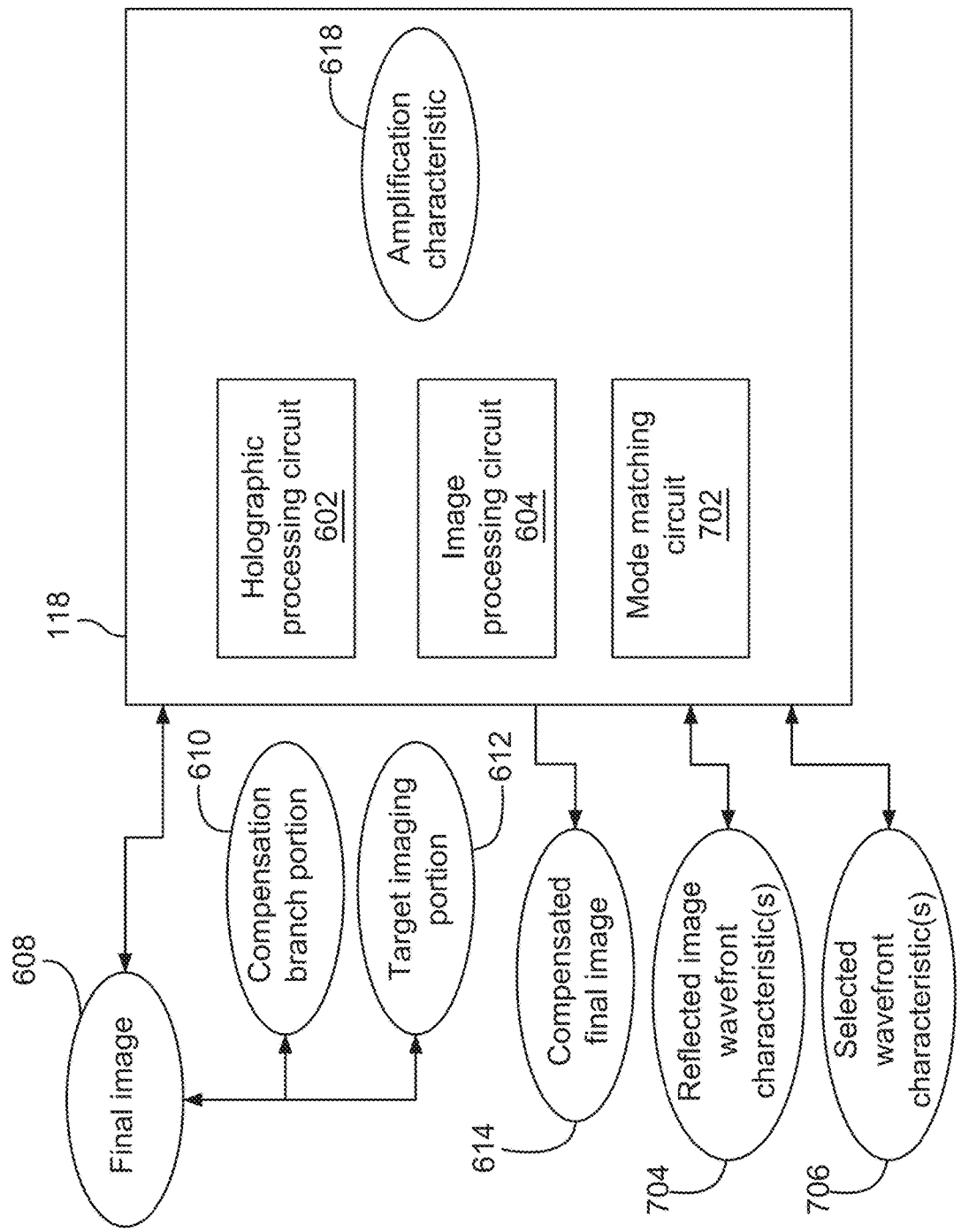
FIG. 7 is a schematic depiction of a controller for providing a mode matched compensation branch for holographic vibration imaging.

Referencing FIG. 7, an example controller 118 to support mode matching operations, for example for a system 100 such as depicted in FIG. 3, is schematically depicted. The example controller 118 includes a mode matching circuit 702 that applies a selected wavefront characteristic 706 to the compensation branch. In certain embodiments, the selected wavefront characteristic 706 is selected to match a reflected image wavefront characteristic 704 (e.g., determined according to a distance between the target location 107 and the imaging mixer 108), to be within a selected difference value of the reflected image wavefront characteristic 704 (e.g., where a match is not achievable; would otherwise be expensive to achieve, where expense may be determined according to cost of components of the system 100, size constraints for the system 100, and/or operational capability of the system 100 such as actuator precision, range of motion, and/or range of optical power adjustment for a VFL; and/or where a responsiveness of actuator(s) in the system 100 prevent matching of the characteristics 704, 706, such as during high speed or transient operations). In certain embodiments, the selected wavefront characteristic 704 may be selected to support certain processing operations and/or to support certain simplified hardware configurations, for example to select one from a discrete number of wavefront characteristics, which may be selected in response to the reflected image wavefront characteristic 704 but not necessarily matching, thereby allowing for hardware operations and/or processing operations that only have to account for a discrete number of values for the selected wavefront characteristic 706. Example operations of the mode matching circuit 702 to apply the selected wavefront characteristic include, without limitation, one or more of: adjusting a distance between a fiber terminator 115 of the amplified characteristic branch and the compensation branch mixer 119; adjusting a distance between a fiber terminator 112 of the second branch and the compensation branch mixer 119; and/or adjusting a distance between the mixing optical device (e.g., compensation branch mixer 119) and the mode matching lens 114. In certain embodiments, the mode matching circuit 702 applies the selected wavefront characteristic 706 by providing a command to an actuator, where the actuator is responsive to the command to adjust a distance or perform other operations herein. In certain embodiments, the mode matching circuit 702 includes one or more actuator(s) that perform the selected operations. In certain embodiments, the mode matching circuit 702 applies the selected wavefront characteristic 706 in response to a target location distance (e.g., a distance from the imaging mixer 108 to the target 107).

An example mode matching circuit 702 applies the selected wavefront characteristic 706 by adjusting an optical power of the mode matching lens 114, for example by selecting a lens from a set of available lenses (e.g., rotating a group of lenses to position a selected lens into the optical path) and/or by adjusting an optical power of a VFL. In certain embodiments, the mode matching circuit 702 applies the selected wavefront characteristic 706 by providing a command to an actuator, where the actuator is responsive to the command to adjust the optical power of the mode matching lens 114. In certain embodiments, the mode matching circuit 702 includes one or more actuator(s) that perform the selected operations.

Figure 8:
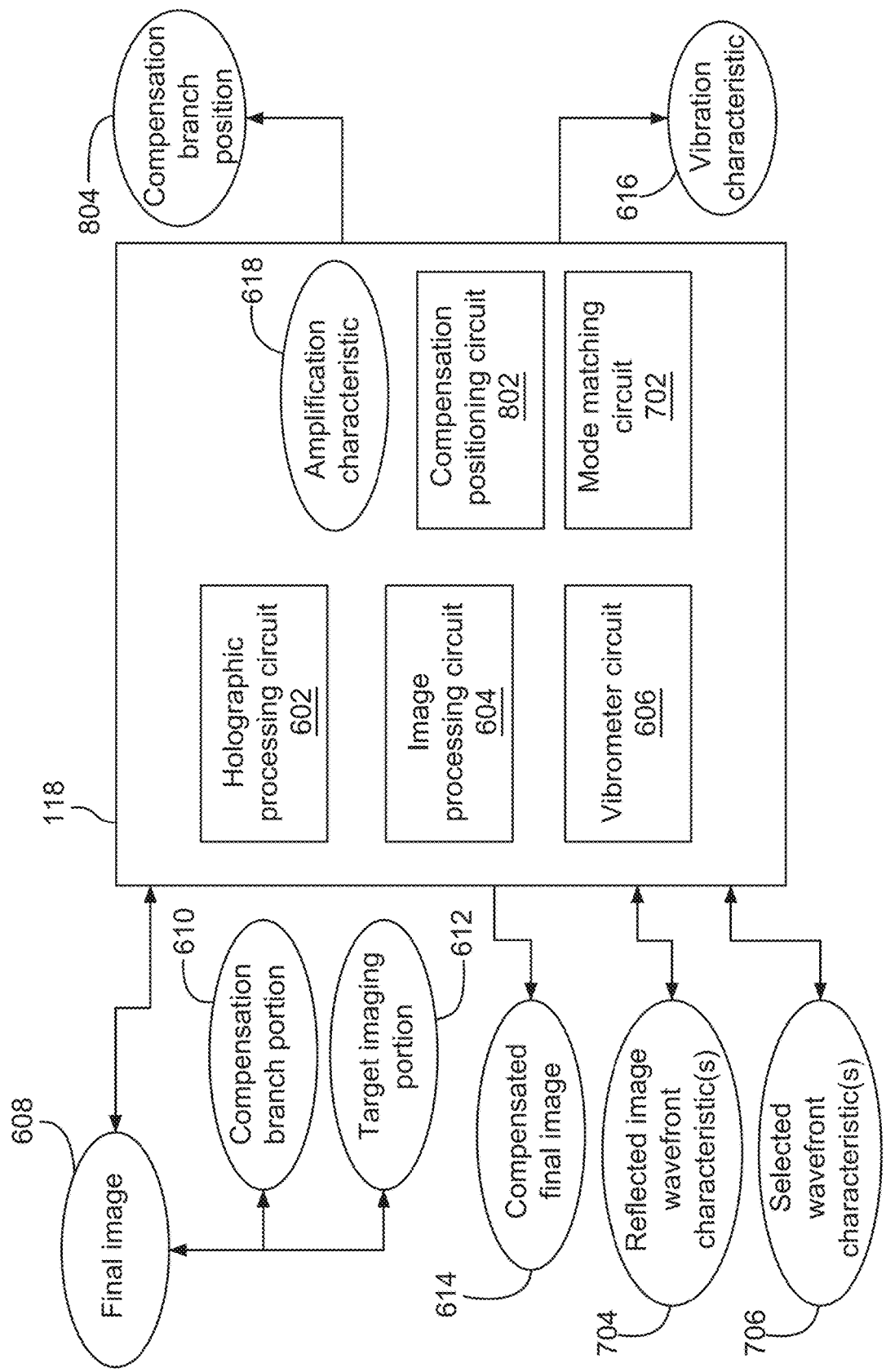
FIG. 8 is a schematic depiction of a controller for providing a vibrometer quality final image of a target location.

Referencing FIG. 8, an example controller 118 for determining a vibration characteristic 616 of a target location 107 is schematically depicted. The example controller 118 includes a holographic processing circuit 602 structured to determine an amplification characteristic 618 in response to the selected wavefront characteristic 706 and a reflected image wavefront characteristic 704, and a mode matching circuit 702 structured to select the wavefront characteristic 706 to match a reflected image wavefront characteristic 704. An example controller 118 further includes a vibrometer circuit 606 that determines a vibration characteristic 616 of the target location 107 in response to the compensated vinal image 614.

An example system 100 includes an optical path of the compensation branch configured to position (e.g., position 117) the compensation branch to an unused portion of the final image, to a selected portion of the final image, to a modulated portion of the final image, and/or to a controller portion of the final image. The position 117 may be adjusted over time, for example in a rastered manner, according to selected portions of the final image that are not of interest at a given time, and/or to be moved to provide final image captures where the position 117 is not fixed over a given position of the final image. The example system includes a controller 118 having a compensation positioning circuit 802 that controls a position 117 of the compensation branch on the final image. An example compensation positioning circuit 802 controls the position 117 of the compensation branch on the final image according to any operations or embodiments herein, including at least controlling the position 117 to an unused portion of the final image, to modulate the position 117 on the final image, and/or to control the position 117 to a selected portion of the final image. The example compensation positioning circuit 802 controls the position 117 of the compensation branch by performing one or more of, without limitation: controlling a position of a fiber terminator of the amplified characteristic branch and/or a position of a fiber terminator of the second branch; controlling a position of the mode matching lens; controlling a position of the compensation branch mixer; adjusting an angle of the compensation branch mixer; controlling a position of the imaging mixer; and/or adjusting an angle of the mode matching lens. Additionally or alternatively, the compensation positioning circuit 802 controls the position 116 of the local oscillator. In certain embodiments, the compensation positioning circuit 802 controls the positions 116, 117 by providing a command to an actuator responsive to perform the selected adjustment(s). In certain embodiments, the compensation positioning circuit 802 includes an actuator that performs the selected adjustment(s). Without limitation to any other aspect of the present disclosure, any operations that adjust the positions 116, 117 of the virtual images of the local oscillator and/or compensation branch are contemplated herein to select, control, and/or modulate the positions 116, 117.

Example systems herein may be utilized in either a pupil plane detection mode or an image plane detection mode. In the pupil plane detection mode, which may be referenced as "lensless imaging", the real interference signal (e.g., the mixed signal, with the local oscillator and monitor signal) is detected at the pupil plane—for example at the aperture 109 in the example of FIG. 3. Computational imaging techniques are then used to form the desired complex image (e.g., an image including the amplitude and phase) using the monitor signal. The example of FIG. 3 is consistent with such embodiments. The operations to perform the computational imaging techniques may be performed by controller, computing devices, circuits, or the like as set forth throughout the present disclosure. In the image plane detection mode, the interference signal is focused by a physical lens and detected as the real image at the lens image plane. Computational imaging techniques are then used to form the desired complex image (e.g., an image including the amplitude and phase) including the monitor signal from the mixed real image (e.g., with the monitor signal placed on the real image at a selected location, which may be outside the imaging area of interest, and/or overlaid at least in part on the imaging area and subtracted (e.g., as a zero lag cross correlation) from other imaging data). The example of FIG. 3, with a focusing lens added, may be utilized to perform operations in the image plane detection mode, and/or the final imaging lens 110 characteristics may be adjusted to provide the focusing on the image plane.

In certain embodiments, an optical field stop may be utilized in the return signal path (e.g., returning from the target 107 to the imaging mixer 108) to limit the target field to the desired portion of the final image (e.g., whether in the pupil plane or focal plane). The monitor signal may then be placed outside of the stopped image, to ensure that the monitor signal and image (or image signal) do not experience any effects on each other.

In certain embodiments, polarization diversity may be utilized to isolate the monitor signal from the image signal, simplifying isolation of the two signals, and/or improving noise separation operations (e.g., reducing any detrimental effects on the image signal of separation operations, and/or simplifying separation operations). For example, applying distinct polarization values to the monitoring signal and the image signal can allow those two signals to be readily separated and/or isolated.

In certain embodiments, one or more adjustable fiber delay lines may be utilized on the monitor signal to enhance the performance of the monitor based correction. In the example of FIG. 3, the adjustable fiber delay lines are applied to the compensation branch, and may be configured with a delay to path-length-match the measured monitor to range delays between the image frame sample times. In another example, the adjustable fiber delay lines may be used to apply multiple delays that are used to sample the monitor multiple times over the interframe time. The utilization of putting additional monitor delay lines allows for the determination of amplifier phase variations, for example where the phase variation of the amplifier has a faster time dynamic than the time dynamic of the imaging frames, that can perform improved compensation. Embodiments herein are capable to perform high performance vibrometer determinations for both high speed vibration detection (e.g., which would lead to high imaging frame rates), and/or for longer ranges to target. Example imaging speeds up to 100 nanoseconds, and/or ranges up to the 10s of km, are readily configurable for embodiments of the present disclosure.

Figure 4:
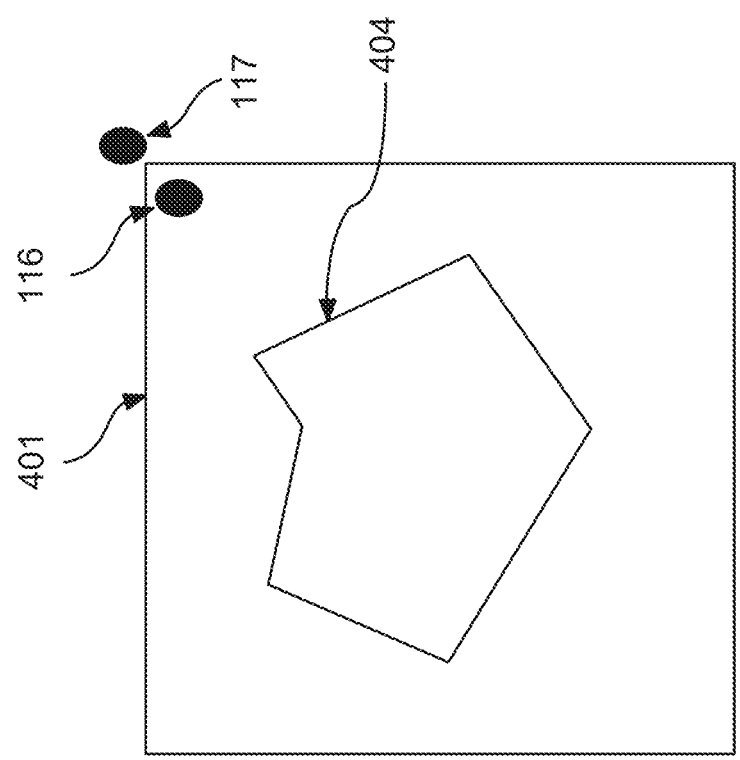
FIG. 4 is a schematic depiction of a field of view, and virtual image locations, consistent with certain embodiments of the present disclosure.

Referencing FIG. 4, an example final image 401 is schematically depicted. In the example of FIG. 4, example target data 404 is depicted in a portion of the final image 401, with the local oscillator position 116 in a selected position, and with the compensation branch position 117 in a selected position. As described throughout the present disclosure, the positions 116, 117 may be outside of the data area of the final image, within the data area of the final image, and/or may be moved to selected positions and/or modulated.

Figure 5:
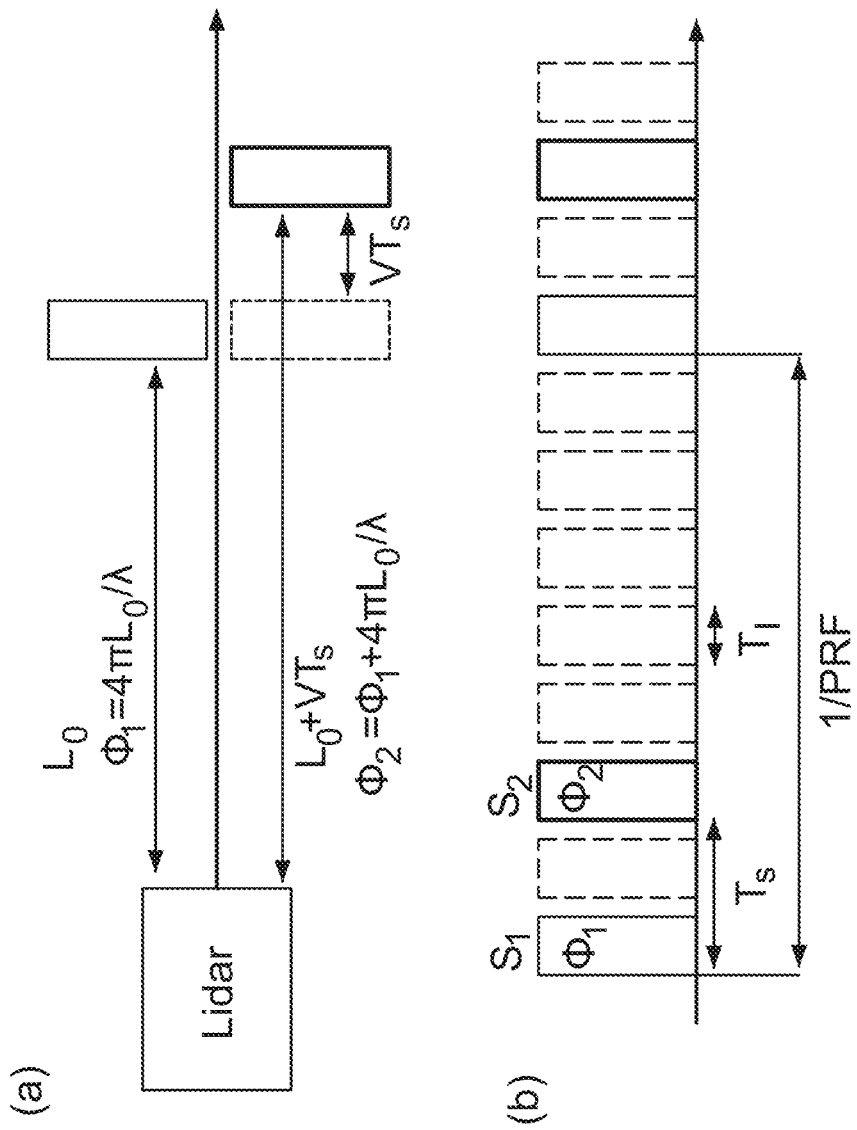
FIG. 5 is a schematic depiction of a pulse processing operation consistent with certain embodiments of the present disclosure.

Referencing FIG. 5, an example processing operation to determine a vibration characteristic 618, for example to determine a vibration measurement for the target location 107, is schematically depicted. In the example of FIG. 5, poly pulse processing applied to each pixel in a volume of holographic data is schematically depicted. In the example of FIG. 5, the upper portion determines a distance to the target and determines the change in position over time, for example as a fraction of a wavelength. The embodiment of FIG. 5 utilizes individual pulses to provide a high resolution range determination, with a difference between pulses to determine velocity. In the example of FIG. 5, the 1/PRF (pulse repetition frequency) value is the period of the local oscillator, and the width of a pulse (e.g., $T_1$) as the capture time. Accordingly, an example system 100 captures multiple pulses within a given period of the local oscillator. In certain embodiments, the difference between pulses ($T_s$) is utilized to determine the velocity of the target location. As multiple pulses are available within a period of the local oscillator, different pairs within the pulse train can be selected, for example based on a distance to the target, a time of flight to the target, a sampling rate available for pulse measurements, or the like, allowing for real time adaptive selection of pulses for determining the velocity of the target location. The example of FIG. 5 depicts pulses at (a) in the upper portion of FIG. 5, which depicts the movement of the target surface (e.g., according to vibration of the surface, and/or bulk movement of the surface), for example adjusting the detected phase of the signal due to motion of the target. The example of FIG. 5 depicts pulses at (b), where multiple sampling windows are provided within a single imaging frame, where the distance between samples may be selected (e.g., with adjacent samples being the fastest rate possible). In embodiments, a first pulse train (b) is utilized to determine the base imaging signal (e.g., signal plus noise, or the full mixed imaging signal of FIG. 3), and a second pulse train (b) is used to determine the system noise (e.g., as injected by amplification), where the system noise is a common mode noise (e.g., experienced by all pixels) and subtracted out with a zero lag cross correlation, or a coherent on receive technique.

Figure 9:
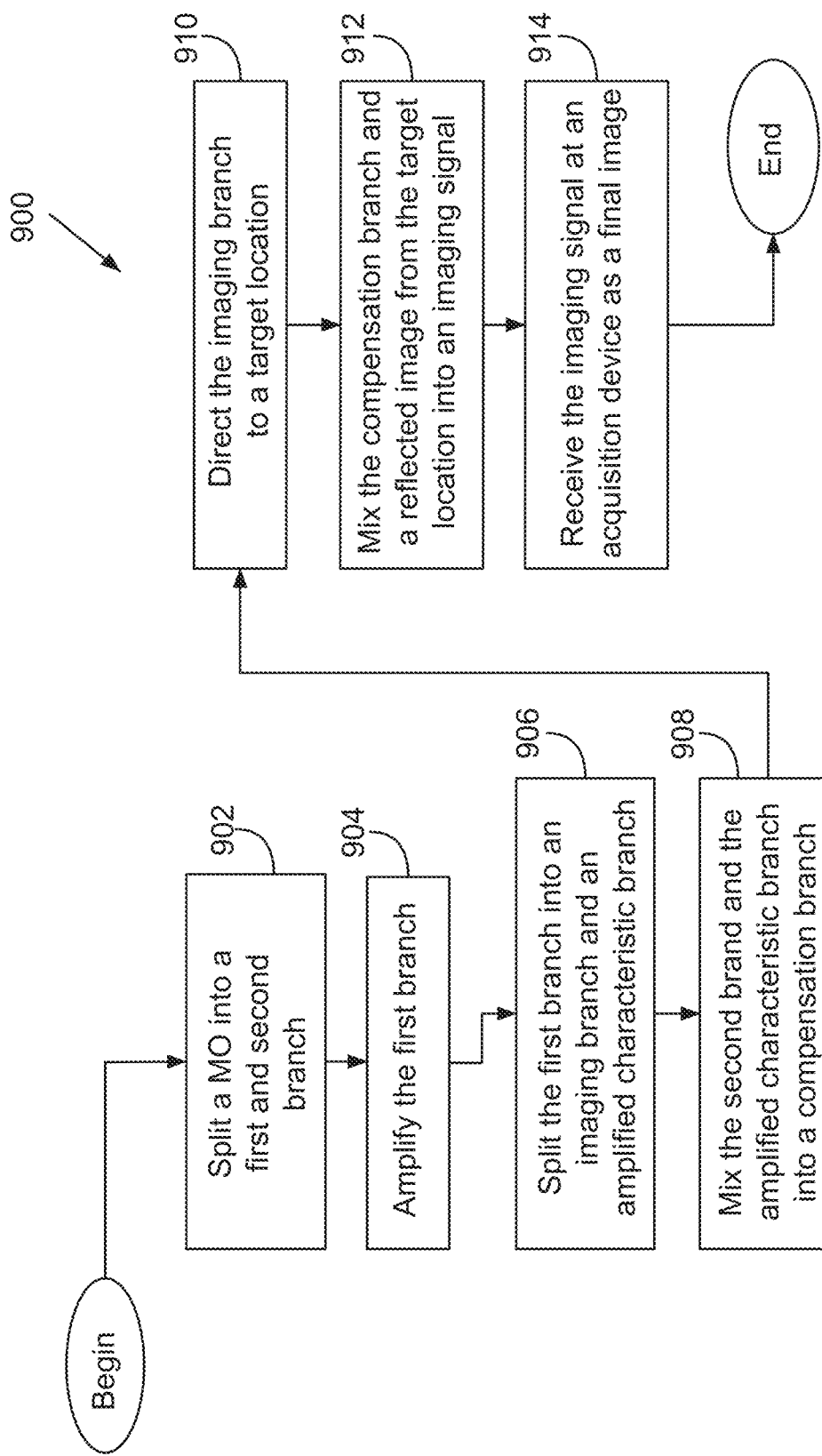
FIG. 9 is a schematic flow diagram of a procedure for vibrometer quality imaging of a target location.

Referencing FIG. 9, an example procedure 900 for capturing amplifier compensated holographic imaging data for a target location is schematically depicted. The example procedure 900 includes an operation 902 to split a master oscillator into a first and second branch, an operation 904 to amplify the first branch, an operation 906 to split the first branch into an imaging branch and an amplified characteristic branch, and an operation 908 to mix the second branch and the amplified characteristic branch into a compensation branch. The example procedure 900 further includes an operation 910 to direct the imaging branch to a target location, an operation 912 to mix the compensation branch and a reflected image from the target location into an imaging signal, and an operation 914 to receive the imaging signal at an acquisition device as a final image. The example procedure 900 may be performed, in whole or part, in relation to any systems, assemblies, or configurations set forth herein. Example operations of the procedure 900 may be performed, in whole or part, by any controllers, circuits, or the like as set forth herein.

Referencing FIG. 10, an example procedure includes an operation 1002 to mode match a compensation branch and a reflected image from the target location. Example operations to mode match a compensation branch, and/or components thereof (e.g., the second branch and/or amplified characteristic branch) are contemplated for operation 1002, including without limitation operations of a mode matching circuit 702.

Referencing FIG. 11, an example procedure 1100 for determining a vibration characteristic of a target location is schematically depicted. The example procedure 1100 includes an operation 1102 to determine an amplification characteristic in response to the compensation branch portion of a final image, an operation 1104 to determine a compensated final image in response to the amplification characteristic and the final image, and an operation 1106 to determine a vibration characteristic of the target location in response to the compensated final image. The example procedure 1100 may be performed, in whole or part, in relation to any systems, assemblies, or configurations set forth herein. Example operations of the procedure 1100 may be performed, in whole or part, by any controllers, circuits, or the like as set forth herein.

Figure 12:
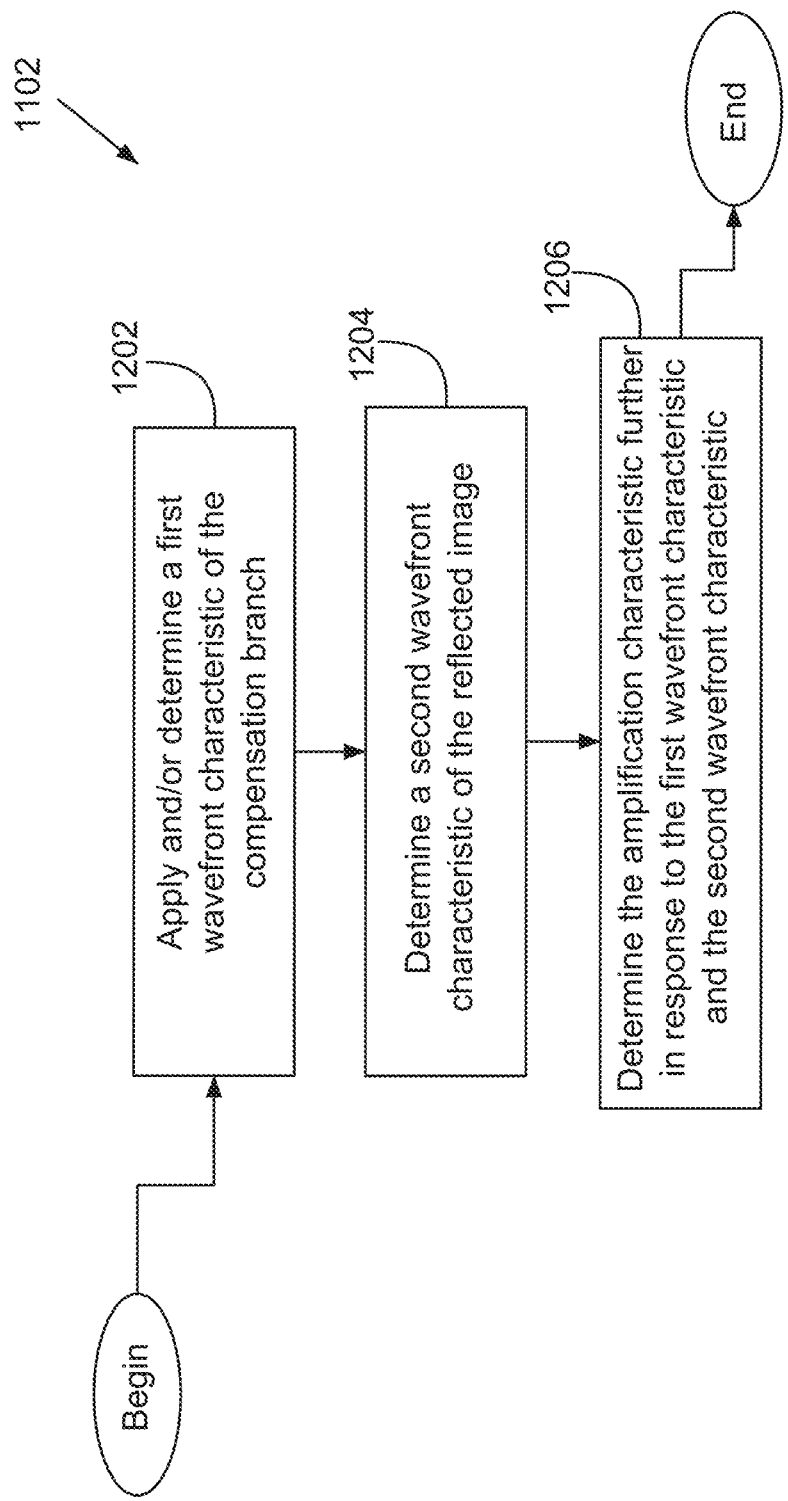
FIG. 12 is a schematic flow diagram of a procedure for determining a compensation parameter for holographic vibration imaging.

Referencing FIG. 12, an example procedure 1102 for determining an amplification characteristic is schematically depicted, for example as a portion or all of an operation 1102 of procedure 1100. The example procedure 1102 includes an operation 1202 to apply and/or determine a first wavefront characteristic of a compensation branch, an operation 1204 to determine a second wavefront characteristic of the reflected image, and an operation 1206 to determine the amplification characteristic further in response to the first wavefront characteristic and the second wavefront characteristic.

The methods and systems described herein may be deployed in part or in whole through a machine having a computer, computing device, processor, circuit, and/or server that executes computer readable instructions, program codes, instructions, and/or includes hardware configured to functionally execute one or more operations of the methods and systems herein. The terms computer, computing device, processor, circuit, and/or server, ("computing device") as utilized herein, should be understood broadly.

An example computing device includes a computer of any type, capable to access instructions stored in communication thereto such as upon a non-transient computer readable medium, whereupon the computer performs operations of the computing device upon executing the instructions. In certain embodiments, such instructions themselves comprise a computing device. Additionally or alternatively, a computing device may be a separate hardware device, one or more computing resources distributed across hardware devices, and/or may include such aspects as logical circuits, embedded circuits, sensors, actuators, input and/or output devices, network and/or communication resources, memory resources of any type, processing resources of any type, and/or hardware devices configured to be responsive to determined conditions to functionally execute one or more operations of systems and methods herein.

Network and/or communication resources include, without limitation, local area network, wide area network, wireless, internet, or any other known communication resources and protocols. Example and non-limiting hardware and/or computing devices include, without limitation, a general-purpose computer, a server, an embedded computer, a mobile device, a virtual machine, and/or an emulated computing device. A computing device may be a distributed resource included as an aspect of several devices, included as an interoperable set of resources to perform described functions of the computing device, such that the distributed resources function together to perform the operations of the computing device. In certain embodiments, each computing device may be on separate hardware, and/or one or more hardware devices may include aspects of more than one computing device, for example as separately executable instructions stored on the device, and/or as logically partitioned aspects of a set of executable instructions, with some aspects comprising a part of one of a first computing device, and some aspects comprising a part of another of the computing devices.

A computing device may be part of a server, client, network infrastructure, mobile computing platform, stationary computing platform, or other computing platform. A processor may be any kind of computational or processing device capable of executing program instructions, codes, binary instructions and the like. The processor may be or include a signal processor, digital processor, embedded processor, microprocessor or any variant such as a co-processor (math co-processor, graphic co-processor, communication co-processor and the like) and the like that may directly or indirectly facilitate execution of program code or program instructions stored thereon. In addition, the processor may enable execution of multiple programs, threads, and codes. The threads may be executed simultaneously to enhance the performance of the processor and to facilitate simultaneous operations of the application. By way of implementation, methods, program codes, program instructions and the like described herein may be implemented in one or more threads. The thread may spawn other threads that may have assigned priorities associated with them; the processor may execute these threads based on priority or any other order based on instructions provided in the program code. The processor may include memory that stores methods, codes, instructions and programs as described herein and elsewhere. The processor may access a storage medium through an interface that may store methods, codes, and instructions as described herein and elsewhere. The storage medium associated with the processor for storing methods, programs, codes, program instructions or other type of instructions capable of being executed by the computing or processing device may include but may not be limited to one or more of a CD-ROM, DVD, memory, hard disk, flash drive, RAM, ROM, cache and the like.

A processor may include one or more cores that may enhance speed and performance of a multiprocessor. In embodiments, the process may be a dual core processor, quad core processors, other chip-level multiprocessor and the like that combine two or more independent cores (called a die).

The methods and systems described herein may be deployed in part or in whole through a machine that executes computer readable instructions on a server, client, firewall, gateway, hub, router, or other such computer and/or networking hardware. The computer readable instructions may be associated with a server that may include a file server, print server, domain server, internet server, intranet server and other variants such as secondary server, host server, distributed server and the like. The server may include one or more of memories, processors, computer readable transitory and/or non-transitory media, storage media, ports (physical and virtual), communication devices, and interfaces capable of accessing other servers, clients, machines, and devices through a wired or a wireless medium, and the like. The methods, programs, or codes as described herein and elsewhere may be executed by the server. In addition, other devices required for execution of methods as described in this application may be considered as a part of the infrastructure associated with the server.

The server may provide an interface to other devices including, without limitation, clients, other servers, printers, database servers, print servers, file servers, communication servers, distributed servers, and the like. Additionally, this coupling and/or connection may facilitate remote execution of instructions across the network. The networking of some or all of these devices may facilitate parallel processing of program code, instructions, and/or programs at one or more locations without deviating from the scope of the disclosure. In addition, all the devices attached to the server through an interface may include at least one storage medium capable of storing methods, program code, instructions, and/or programs. A central repository may provide program instructions to be executed on different devices. In this implementation, the remote repository may act as a storage medium for methods, program code, instructions, and/or programs.

The methods, program code, instructions, and/or programs may be associated with a client that may include a file client, print client, domain client, internet client, intranet client and other variants such as secondary client, host client, distributed client and the like. The client may include one or more of memories, processors, computer readable transitory and/or non-transitory media, storage media, ports (physical and virtual), communication devices, and interfaces capable of accessing other clients, servers, machines, and devices through a wired or a wireless medium, and the like. The methods, program code, instructions, and/or programs as described herein and elsewhere may be executed by the client. In addition, other devices required for execution of methods as described in this application may be considered as a part of the infrastructure associated with the client.

The client may provide an interface to other devices including, without limitation, servers, other clients, printers, database servers, print servers, file servers, communication servers, distributed servers, and the like. Additionally, this coupling and/or connection may facilitate remote execution of methods, program code, instructions, and/or programs across the network. The networking of some or all of these devices may facilitate parallel processing of methods, program code, instructions, and/or programs at one or more locations without deviating from the scope of the disclosure. In addition, all the devices attached to the client through an interface may include at least one storage medium capable of storing methods, program code, instructions, and/or programs. A central repository may provide program instructions to be executed on different devices. In this implementation, the remote repository may act as a storage medium for methods, program code, instructions, and/or programs.

The methods and systems described herein may be deployed in part or in whole through network infrastructures. The network infrastructure may include elements such as computing devices, servers, routers, hubs, firewalls, clients, personal computers, communication devices, routing devices and other active and passive devices, modules, and/or components as known in the art. The computing and/or non-computing device(s) associated with the network infrastructure may include, apart from other components, a storage medium such as flash memory, buffer, stack, RAM, ROM and the like. The methods, program code, instructions, and/or programs described herein and elsewhere may be executed by one or more of the network infrastructural elements.

The methods, program code, instructions, and/or programs described herein and elsewhere may be implemented on a cellular network having multiple cells. The cellular network may either be frequency division multiple access (FDMA) network or code division multiple access (CDMA) network. The cellular network may include mobile devices, cell sites, base stations, repeaters, antennas, towers, and the like.

The methods, program code, instructions, and/or programs described herein and elsewhere may be implemented on or through mobile devices. The mobile devices may include navigation devices, cell phones, mobile phones, mobile personal digital assistants, laptops, palmtops, netbooks, pagers, electronic books readers, music players and the like. These devices may include, apart from other components, a storage medium such as a flash memory, buffer, RAM, ROM and one or more computing devices. The computing devices associated with mobile devices may be enabled to execute methods, program code, instructions, and/or programs stored thereon. Alternatively, the mobile devices may be configured to execute instructions in collaboration with other devices. The mobile devices may communicate with base stations interfaced with servers and configured to execute methods, program code, instructions, and/or programs. The mobile devices may communicate on a peer-to-peer network, mesh network, or other communications network. The methods, program code, instructions, and/or programs may be stored on the storage medium associated with the server and executed by a computing device embedded within the server. The base station may include a computing device and a storage medium. The storage device may store methods, program code, instructions, and/or programs executed by the computing devices associated with the base station.

The methods, program code, instructions, and/or programs may be stored and/or accessed on machine readable transitory and/or non-transitory media that may include: computer components, devices, and recording media that retain digital data used for computing for some interval of time; semiconductor storage known as random access memory (RAM); mass storage typically for more permanent storage, such as optical discs, forms of magnetic storage like hard disks, tapes, drums, cards and other types; processor registers, cache memory, volatile memory, non-volatile memory; optical storage such as CD, DVD; removable media such as flash memory (e.g. USB sticks or keys), floppy disks, magnetic tape, paper tape, punch cards, stand-alone RAM disks, Zip drives, removable mass storage, off-line, and the like; other computer memory such as dynamic memory, static memory, read/write storage, mutable storage, read only, random access, sequential access, location addressable, file addressable, content addressable, network attached storage, storage area network, bar codes, magnetic ink, and the like.

Certain operations described herein include interpreting, receiving, and/or determining one or more values, parameters, inputs, data, or other information ("receiving data"). Operations to receive data include, without limitation: receiving data via a user input; receiving data over a network of any type; reading a data value from a memory location in communication with the receiving device; utilizing a default value as a received data value; estimating, calculating, or deriving a data value based on other information available to the receiving device; and/or updating any of these in response to a later received data value. In certain embodiments, a data value may be received by a first operation, and later updated by a second operation, as part of the receiving a data value. For example, when communications are down, intermittent, or interrupted, a first receiving operation may be performed, and when communications are restored an updated receiving operation may be performed.

Certain logical groupings of operations herein, for example methods or procedures of the current disclosure, are provided to illustrate aspects of the present disclosure. Operations described herein are schematically described and/or depicted, and operations may be combined, divided, re-ordered, added, or removed in a manner consistent with the disclosure herein. It is understood that the context of an operational description may require an ordering for one or more operations, and/or an order for one or more operations may be explicitly disclosed, but the order of operations should be understood broadly, where any equivalent grouping of operations to provide an equivalent outcome of operations is specifically contemplated herein. For example, if a value is used in one operational step, the determining of the value may be required before that operational step in certain contexts (e.g., where the time delay of data for an operation to achieve a certain effect is important), but may not be required before that operation step in other contexts (e.g. where usage of the value from a previous execution cycle of the operations would be sufficient for those purposes). Accordingly, in certain embodiments an order of operations and grouping of operations as described is explicitly contemplated herein, and in certain embodiments re-ordering, subdivision, and/or different grouping of operations is explicitly contemplated herein.

The methods and systems described herein may transform physical and/or or intangible items from one state to another. The methods and systems described herein may also transform data representing physical and/or intangible items from one state to another.

The methods and/or processes described above, and steps thereof, may be realized in hardware, program code, instructions, and/or programs or any combination of hardware and methods, program code, instructions, and/or programs suitable for a particular application. The hardware may include a dedicated computing device or specific computing device, a particular aspect or component of a specific computing device, and/or an arrangement of hardware components and/or logical circuits to perform one or more of the operations of a method and/or system. The processes may be realized in one or more microprocessors, microcontrollers, embedded microcontrollers, programmable digital signal processors or other programmable device, along with internal and/or external memory. The processes may also, or instead, be embodied in an application specific integrated circuit, a programmable gate array, programmable array logic, or any other device or combination of devices that may be configured to process electronic signals. It will further be appreciated that one or more of the processes may be realized as a computer executable code capable of being executed on a machine readable medium.

The computer executable code may be created using a structured programming language such as C, an object oriented programming language such as C++, or any other high-level or low-level programming language (including assembly languages, hardware description languages, and database programming languages and technologies) that may be stored, compiled or interpreted to run on one of the above devices, as well as heterogeneous combinations of processors, processor architectures, or combinations of different hardware and computer readable instructions, or any other machine capable of executing program instructions.

Thus, in one aspect, each method described above, and combinations thereof, may be embodied in computer executable code that, when executing on one or more computing devices, performs the steps thereof. In another aspect, the methods may be embodied in systems that perform the steps thereof, and may be distributed across devices in a number of ways, or all of the functionality may be integrated into a dedicated, standalone device or other hardware. In another aspect, the means for performing the steps associated with the processes described above may include any of the hardware and/or computer readable instructions described above. All such permutations and combinations are intended to fall within the scope of the present disclosure.

What is claimed is:

1. A method, comprising:
   splitting a master oscillator beam into a first branch and a second branch;
   amplifying the first branch;
   splitting the amplified first branch into an imaging branch and an amplified characteristic branch;
   mixing the second branch and the amplified characteristic branch into a compensation branch;
   mode matching the compensation branch in response to a target location distance;
   directing the imaging branch to a target location;
   mixing the compensation branch and a reflected image from the target location into an imaging signal; and
   receiving the imaging signal at an acquisition device as a final image.

2. The method of claim 1, wherein receiving the imaging signal further comprises capturing phase information and amplitude information of the imaging signal.

3. The method of claim 1, wherein mixing the compensation branch and the reflected image comprises positioning the compensation branch to an unused position of the final image.

4. The method of claim 1, wherein mixing the compensation branch and the reflected image comprises modulating a position of the compensation branch on the final image.

5. The method of claim 1, further comprising determining an amplification characteristic in response to a compensation branch portion of the final image, and determining a compensated final image in response to the amplification characteristic and the final image.

6. The method of claim 5, further comprising determining a vibration characteristic of the target location in response to the compensated final image.

7. The method of claim 1, wherein the mode matching comprises matching a first wavefront characteristic of the compensation branch to a second wavefront characteristic of the reflected image.

8. The method of claim 1, wherein the mode matching comprises applying a first wavefront characteristic to the compensation branch.

9. The method of claim 5, wherein the mode matching comprises applying a first wavefront characteristic to the compensation branch.

10. The method of claim 9, further comprising:
    determining a second wavefront characteristic of the reflected image; and
    determining the amplification characteristic further in response to the first wavefront characteristic and the second wavefront characteristic.

11. The method of claim 1, wherein the mode matching comprises at least one of:
    adjusting a distance between a fiber terminator of the amplified characteristic branch and a compensation branch mixing optical device;

adjusting a distance between a fiber terminator of the second branch and the compensation branch mixing optical device; or adjusting a distance between the compensation branch mixing optical device and a mode matching lens.

12. The method of claim 1, wherein the mode matching comprises adjusting an optical power of a mode matching lens, wherein the mode matching lens is interposed between a compensation branch mixing optical device and an imaging signal mixing optical device.

13. A system, comprising:
a master oscillator configured to provide a master oscillator beam;
a first fiber beam splitter configured to split the master oscillator beam into a first branch and a second branch;
a second fiber beam splitter configured to split the first branch into an imaging branch and an amplified characteristic branch;
a compensation branch mixer configured to mix the second branch and the amplified characteristic branch into a compensation branch;
a mode matching lens configured to apply a selected wavefront characteristic to the compensation branch;
transmission optics configured to direct the imaging branch to a target location;
an imaging mixer configured to mix the compensation branch and a reflected image from the target location into an imaging signal; and
an acquisition device configured to receive the imaging signal as a final image.

14. The system of claim 13, wherein the acquisition device comprises a photonic array.

15. The system of claim 14, further comprising an aperture interposed between the imaging mixer and the photonic array.

16. The system of claim 13, wherein the acquisition device is further configured to capture phase information and amplitude information of the imaging signal.

17. The system of claim 16, wherein the acquisition device is further configured to capture the phase information and the amplitude information of the imaging signal as a holographic frame of the final image.

18. The system of claim 17, further comprising a controller, the controller comprising:
a holographic processing circuit structured to determine an amplification characteristic in response to a compensation branch portion of the final image; and
an image processing circuit structured to determine a compensated final image in response to the amplification characteristic and the final image.

19. The system of claim 18, wherein the controller further comprises:
a vibrometer circuit structured to determine a vibration characteristic of the target location in response to the compensated final image.

20. The system of claim 13, further comprising a controller, the controller comprising:
a mode matching circuit structured to apply the selected wavefront characteristic by performing at least one operation selected from the operations consisting of:

adjusting a distance between a fiber terminator of the amplified characteristic branch and the compensation branch mixer;
adjusting a distance between a fiber terminator of the second branch and the compensation branch mixer; or
adjusting a distance between the compensation branch mixing optical device and the mode matching lens.

21. The system of claim 20, wherein the mode matching circuit is further structured to apply the selected wavefront characteristic in response to a target location distance.

22. The system of claim 13, further comprising a controller, the controller comprising:
a mode matching circuit structured to apply the selected wavefront characteristic by adjusting an optical power of the mode matching lens.

23. The system of claim 22, wherein the mode matching lens comprises a varifocal lens.

24. The system of claim 13, wherein the selected wavefront characteristic comprises a matched wavefront to a reflected image wavefront characteristic.

25. The system of claim 13, further comprising a controller, the controller comprising:
a mode matching circuit structured to select the wavefront characteristic to match a reflected image wavefront characteristic.

26. The system of claim 13, further comprising a controller, the controller comprising:
a holographic processing circuit structured to determine an amplification characteristic in response to the selected wavefront characteristic and a reflected image wavefront characteristic.

27. The system of claim 26, further comprising a vibrometer circuit structured to determine a vibration characteristic of the target location in response to the compensated final image.

28. The system of claim 13, wherein an optical path of the compensation branch is configured to position the compensation branch to an unused portion of the final image.

29. The system of claim 13, further comprising a controller, the controller comprising:
a compensation positioning circuit structured to control a position of the compensation branch on the final image.

30. The system of claim 29, wherein the compensation positioning circuit is further structured to control the position of the compensation branch to an unused portion of the final image.

31. The system of claim 29, wherein the compensation positioning circuit is further structured to modulate the position of the compensation branch on the final image.

32. The system of claim 29, wherein the compensation positioning circuit is further structured to control the position of the compensation branch on the final image by performing at least one of:
controlling a position of a fiber terminator of the amplified characteristic branch and a position of a fiber terminator of the second branch;
controlling a position of the mode matching lens;
controlling a position of the compensation branch mixer;
adjusting an angle of the compensation branch mixer;
controlling a position of the imaging mixer; or
adjusting an angle of the mode matching lens.

* * * * *

UNITED STATES PATENT AND TRADEMARK OFFICE
CERTIFICATE OF CORRECTION

| | | |
|---|---|---|
| PATENT NO. | : 12,045,010 B2 | Page 1 of 1 |
| APPLICATION NO. | : 18/396691 | |
| DATED | : July 23, 2024 | |
| INVENTOR(S) | : Dierking et al. | |

It is certified that error appears in the above-identified patent and that said Letters Patent is hereby corrected as shown below:

In the Specification

In Column 7, Line 33, delete "704" and insert --706-- therefor

In Column 8, Line 18, delete "vinal" and insert --final-- therefor

In Column 10, Line 5, delete "618," and insert --616,-- therefor

Signed and Sealed this
Fourth Day of November, 2025

John A. Squires
*Director of the United States Patent and Trademark Office*